This invention relates to method and apparatus for compensation of gas analyzers so that the indicated output will be accurate and unaffected by changes in barometric pressure.

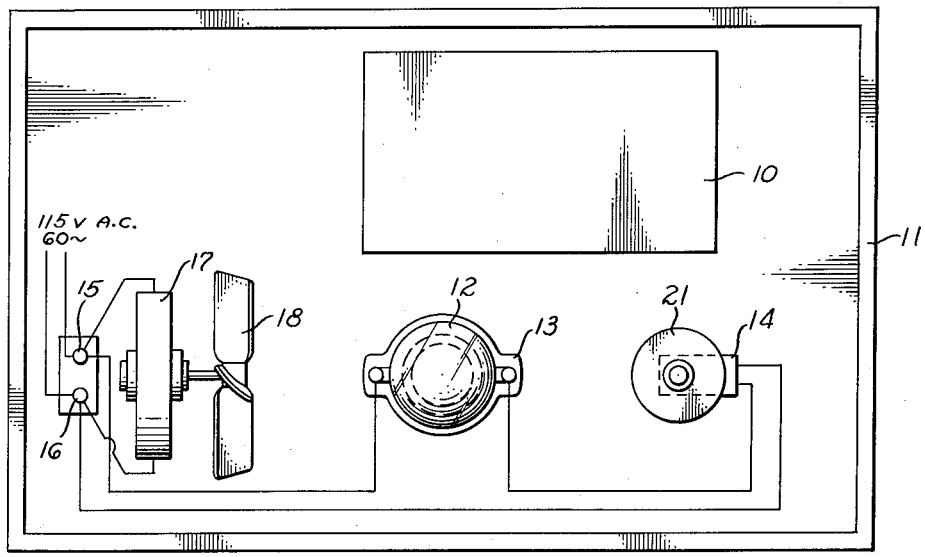
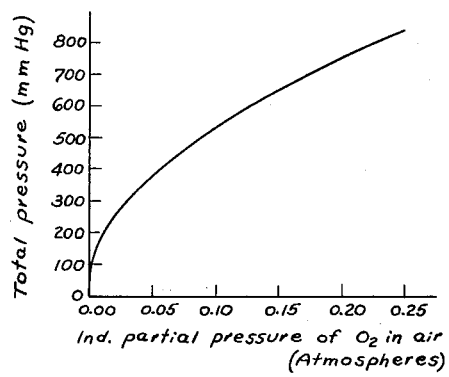
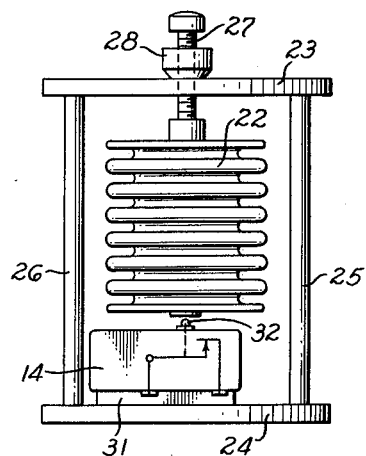
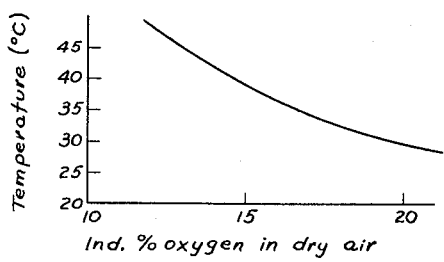
INVENTORS.
LOUIS C. THAYER
MALBONE W. GREENE
BY THEIR ATTORNEYS.
HARRIS, KIECH, FOSTER & HARRIS 3,031,882
PRESSURE COMPENSATION FOR GAS
ANALYZERS
Louis C. Thayer, Duarte, and Malbone W. Greene, Pasadena, Calif., assignors, by mesne assignments, to Beckman Instruments, Inc., Fullerton, Calif., a corporation of California
Filed Jan. 16, 1958, Ser. No. 709,298
8 Claims. (Cl. 73—27)

In gas analyzers of the type based on the flow of gas induced by thermal gradients in combination with magnetic, electric or gravity fields, the reading of the analyzer is influenced by the barometric pressure, the gas being analyzed ordinarily being exhausted to the atmosphere. Examples of such analyzers are shown in United States patents to Pauling, No. 2,416,344, Medlock, No. 2,603,965, Krupp, No. 2,693,103, and Wilson, No. 2,807,159. Ordinarily, such instruments are operated under constant temperature conditions. It is an object of the invention to provide a method for varying the indicated output of a gas analyzer to compensate for other variations produced in the indicated output by changes in barometric pressure so that the indicated output is independent of the actual pressure. Another object of the invention is to provide a method in which changes in barometric pressure at which the instrument is being operated are detected and the set point of the temperature controller is changed with the magnitude of the change in temperature set point having a predetermined ratio to the magnitude of the change in pressure which occurs.

It is another object of the invention to provide a novel apparatus for carrying out the method of the invention. A further object of the invention is to provide a compensation system for a gas analyzer in which a heat source is controlled by a temperature and pressure sensitive switch positioned within a thermally insulated, air pervious enclosure in which the instrument is operated. A further object of the invention is to provide a compressible and expandable switch actuator containing a fluid which exerts an expansive force as a function of the temperature of the fluid, such that the container is compressed by increases in barometric pressure, and is expanded by increases in temperature. It is another object of the invention to provide such a switch actuating mechanism in which the relation between compression forces and expansion forces can be predetermined by selecting the mechanical spring constants of the container and the pressure and temperature characteristics of the fluid within the container.

Other objects and novel details of operation and construction of the invention will more fully appear in the course of the following description. While the specific example to be described herein relates to an oxygen trace analyzer, it is understood that the invention is equally applicable to other types of gas analyzers. The drawing merely shows and the description merely describes a preferred embodiment which is given by way of illustration or example.

In the drawing:
FIG. 1 is a graph showing the variation of indicated output with barometric pressure;
FIG. 2 is a graph showing variation in indicated output with temperature;
FIG. 3 shows a preferred embodiment of the compensation system of the invention; and
FIG. 4 shows a preferred bellows and switch construction.

The theory of operation of gas analyzers of the type based on the flow of gas induced by thermal gradients in combination with magnetic, electric or gravity fields indicates that the sensitivity or indicated output is proportional to the square of the total pressure. This relation is confirmed by experimental data and FIG. 1 shows the relation between indicated partial pressure of oxygen in air and total pressure with a particular oxygen trace analyzer of the type shown in United States patent to Medlock, No. 2,603,965, when operated with a sample having a fixed percentage of oxygen. Of course, the method of the invention is equally applicable to instruments in which the relation between indicated output and pressure is other than a square law relation.

Instruments of this sort are generally used to obtain measurements in terms of percentage composition rather than in terms of partial pressure and the output indicators are calibrated in percent composition for a particular barometric pressure. Then it is necessary to provide a separate calibration or a correction chart or table to compensate the indicated percentage composition for the change in sensitivity of the instrument which occurs due to barometric pressure changes.

In the present invention, the instrument is automatically compensated for barometric pressure changes so that the indicated percentage composition produced at the output of the instrument can be used without further correction being necessary. In instruments of the sort contemplated by this invention, the indicated output is also a function of the temperature at which the instrument is operated, FIG. 2 showing the relation between indicated percentage oxygen in dry air and temperature for the same instrument used in connection with FIG. 1 with a sample having a fixed percentage of oxygen.

In practicing the method of the invention, the sensitivity of the instrument is intentionally changed by varying the temperature at which it is operated, such change in sensitivity being inverse and equal to the change in sensitivity produced by the variation in barometric pressure, so that the prior calibration of indicated output is correct for the new operating condition. Thus no correction of indicated output need be made as barometric pressure changes. For example, in the instrument of FIGS. 1 and 2, a one percent increase in barometric pressure produces a two percent increase in sensitivity and a one degree centigrade increase in temperature produces a two percent decrease in sensitivity. Therefore, the instrument is operated in a substantially constant temperature environment with the set point of the apparatus which controls the temperature being varied as a function of the pressure. That is, changes in barometric pressure are detected and the operating temperature is changed a predetermined amount, depending upon the particular sensitivities of the instrument being controlled, maintaining the indicated output calibration accurate.

A preferred apparatus for carrying out the method of the invention is shown in FIG. 3, wherein an analysis cell 10 of a gas analyzer is mounted in a thermally insulated housing 11. The housing is made sufficiently pervious to air to have the pressure within the housing equal to the pressure around the housing in which the instrument is exhausted.

Means are provided for maintaining the interior of the housing 11 at a substantially constant temperature when the atmospheric pressure remains constant, such means including a heat source and a control unit for energizing the heat source. In a preferred form of the instrument, an incandescent lamp 12 is mounted in a socket 13 and is electrically connected in series with a switch 14 across terminals 15, 16 of a power source. A motor 17 with a fan 18 is also connected across the power source terminals to provide continuous circulation of air within the housing.

The switch 14 is actuated by a thermostat unit 21 which energizes the heat source whenever the temperature within the housing falls below a predetermined value, this predetermined value being a function of a barometric pressure within the housing. The details of a preferred form of a thermostat unit are shown in FIG. 4.

A corrugated bellows 22 is mounted in a frame consisting of an upper plate 23, a lower plate 24, and upstanding rods 25, 26. The upper end of the bellows is fixed to an adjustment screw 27 which is threadedly positioned in the upper plate 23 for moving the upper end of the bellows relative to the frame and housing. A lock nut 28 is threadedly mounted on the screw 27 for locking the screw in any desired position. The switch 14, which may be a normally closed, snap-action, microswitch, is mounted on a terminal block 31 carried on the lower plate 24. The bellows and switch are disposed so that the lower or free end of the bellows will engage the actuating button 32 of the switch upon expansion of the bellows.

The bellows is filled with a volatile fluid and sealed. As the temperature within the housing increases, the vapor pressure of the fluid within the bellows rises increasing the expansion pressure in the bellows. The forces acting on the free end of the bellows are those due to the internal vapor pressure of the fluid within the bellows, the atmospheric pressure on the outside of the bellows, and the spring constant of the bellows itself, the forces due to internal vapor pressure and external atmospheric pressure opposing each other. Therefore, the particular temperature at which the switch is actuated by the bellows will be dependent upon the pressure within the housing at that instant, thereby providing automatic compensation of the operating temperature for changes in operating pressure.

In designing a particular thermostat unit, the change in sensitivity of the analyzer with temperature and pressure is determined. Then the bellows and filling fluid are chosen so that equilibrium of the bellows is obtained at the desired temperature-pressure conditions which produce the compensation of indicated output as described above. In the particular embodiment described herein, trichloroethylene was used as the bellows filling fluid, this material having an increase of 11.4 millimeters mercury pressure per degree centigrade increase in temperature.

Although an exemplary embodiment of the invention has been disclosed and discussed, it will be understood that other applications of the invention are possible and that the embodiment disclosed may be subjected to various changes, modifications and substitutions without necessarily departing from the spirit of the invention. The characteristics of the thermostat unit will be different for different varieties of gas analyzers and is, of course, dependent upon the geometry of the apparatus and the characteristic of the analysis cell.

We claim as our invention:

1. A method of compensating a gas analyzer, the indicated output of which is a function both of the temperature and barometric pressure at which the analyzer is operated, including the steps of: operating the analyzer at a controlled temperature; detecting changes in the barometric pressure at which the analyzer is being operated; and changing the value of the controlled temperature at which the analyzer is operated, as a function of the barometric pressure, to operate at a new temperature with the new pressure such that the indicated output is substantially equal to that of the prior operating temperature and pressure for the same sample gas composition.

2. A method of operating an oxygen analyzer in which the indicated oxygen concentration varies directly with the exhaust pressure and inversely with the ambient temperature, including the steps of: controlling the ambient temperature in which the analyzer is operated; and increasing the value of the controlled temperature as the exhaust pressure increases and decreasing the value of the controlled temperature as the exhaust pressure decreases, with the magnitude of the change in temperature having a predetermined ratio to the magnitude of the change in pressure for maintaining the indicated oxygen concentration substantially independent of the exhaust pressure.

3. In a barometric pressure compensation system for a gas analyzer with the sensitivity of the analysis cell being a function of both operating temperature and pressure, the combination of: a thermally insulated, air pervious enclosure for the analysis cell; heating means for supplying heat to said enclosure; a thermostat positioned within said enclosure for controlling said heating means to maintain the temperature within said enclosure at a particular set point; and means for changing said set point as a function of the pressure within said enclosure to operate the analysis cell at a new temperature such that its sensitivity is maintained substantially constant.

4. In a barometric pressure compensation system for a gas analyzer with the sensitivity of the analysis cell decreasing as a function of temperature increase and increasing as a function of pressure increase, the combination of: a thermally insulated, air pervious enclosure for the analysis cell; heating means for supplying heat to said enclosure; a control for energizing said heating means; and pressure and temperature sensing means for actuating said control to energize said heating means when the temperature within said enclosure falls below a predetermined value, which value is increased as the pressure within said enclosure increases with said value increase being of a magnitude to produce substantially the same sensitivity change as does the pressure increase, but in the opposite direction.

5. A method of operating a gas analyzer sensitive to temperature and pressure to maintain the indicated output thereof independent of ambient temperature and barometric pressure, including the steps of: operating the analyzer in an environment substantially isolated from the ambient temperature; adding heat to the environment; detecting changes in the temperature of the environment; varying the heat input to the environment to maintain a particular value of temperature therein; detecting changes in the barometric pressure of the environment; and varying the heat input to the environment to operate at a different value of temperature as an inverse function of the barometric pressure change with the change in temperature value being of a magnitude to provide substantially the same indicated output as with the initial temperature value and barometric pressure.

6. In a compensation control for a gas analyzer operated in a thermally insulated, air pervious enclosure heated by a heat source, the analyzer in the absence of compensation giving an output reading affected by temperature and pressure variations, the combination of: means for coupling the heat source to a power source, said means including electrical control means for varying the power flow to the heat source and varying thereby the temperature of the enclosure; a pressure actuated bellows mounted within the enclosure and having a fixed end and a free end, said bellows being sealed and containing a fluid producing a predetermined change in expansive pressure for a given change in the temperature of said enclosure, said bellows being compressible on increase of ambient pressure; and means for coupling the motion of said free end of said bellows to said control means for actuation thereof, said bellows having a relative temperature and pressure response such that the effect of pressure change on the output reading is substantially compensated by change of the temperature of said enclosure.

7. In a compensation control for a gas analyzer operated in a thermally insulated, air pervious enclosure heated by a heat source, the analyzer in the absence of compensation giving an output reading affected by temperature and pressure variations, the combination of:

means for coupling the heat source to a power source, said means including an off-on switch for varying the power flow to the heat source and varying thereby the temperature of the enclosure; a pressure actuated bellows mounted within the enclosure and having a fixed end and a free end, said bellows being sealed and containing a fluid producing a predetermined change in expansive pressure for a given change in the temperature of said enclosure, said bellows being compresible on increase of ambient pressure; and means for mounting said bellows for actuation of said switch by said free end, said bellows having a relative temperature and pressure response such that the effect of pressure change on the output reading is substantially compensated by change of the temperature of said enclosure.

8. A control as defined in claim 7 in which said mounting means includes means for varying the position of said fixed end relative to the enclosure in which said bellows is mounted to change the nominal temperature at which the analyzer is operated.

References Cited in the file of this patent

UNITED STATES PATENTS

| | | |
|---|---|---|
| 1,535,829 | Hamilton | Apr. 28, 1925 |
| 1,661,347 | Sawyer | Mar. 6, 1928 |
| 2,032,358 | Folsom et al. | Mar. 3, 1936 |
| 2,123,672 | Du Bois | July 12, 1938 |
| 2,431,801 | Gibson | Dec. 2, 1947 |
| 2,469,038 | Winkler | May 3, 1949 |
| 2,484,207 | Criner et al. | Oct. 11, 1949 |
| 2,662,757 | Mock | Dec. 15, 1953 |
| 2,743,167 | Cherry | Apr. 24, 1956 |
| 2,815,659 | Krupp | Dec. 10, 1957 |

OTHER REFERENCES

Publication: "Principles and Application of Oxygen Recorders" by Riggs, published in Instruments, February 1953, pages 280–286.